C. R. RANEY.
GRAIN SHOCKER.
APPLICATION FILED JAN. 29, 1912.
1,226,369.
Patented May 15, 1917.
6 SHEETS—SHEET 5.
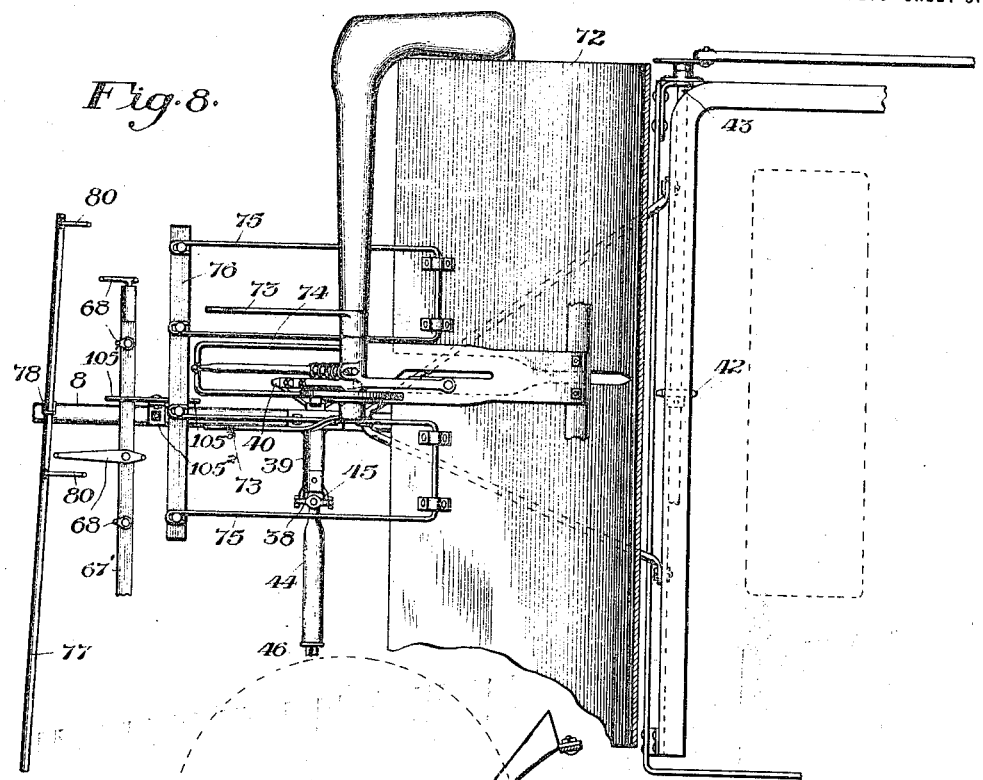
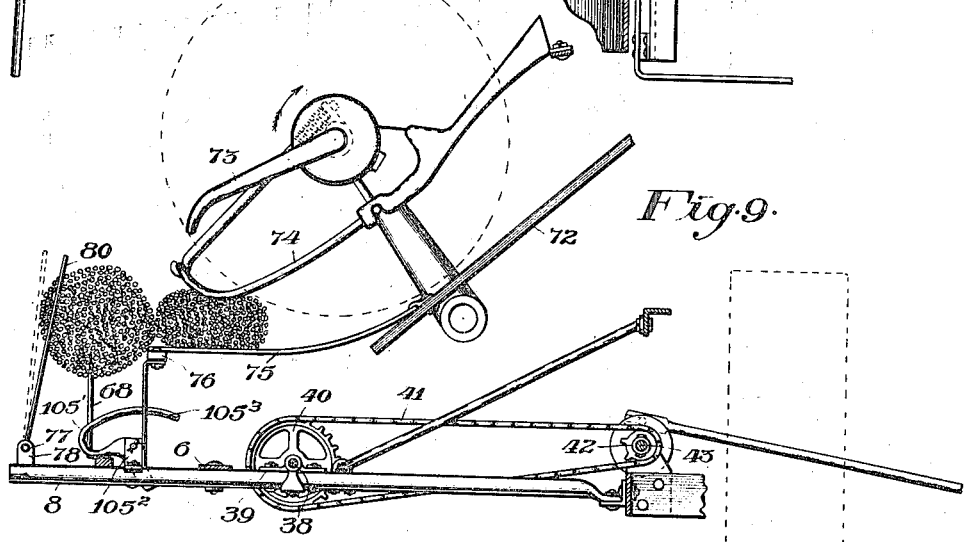
Witnesses:
F. W. Hoffmeister
C. C. Palmer
Inventor.
Clemma R. Raney.
By E. W. Burgess
Attorney.

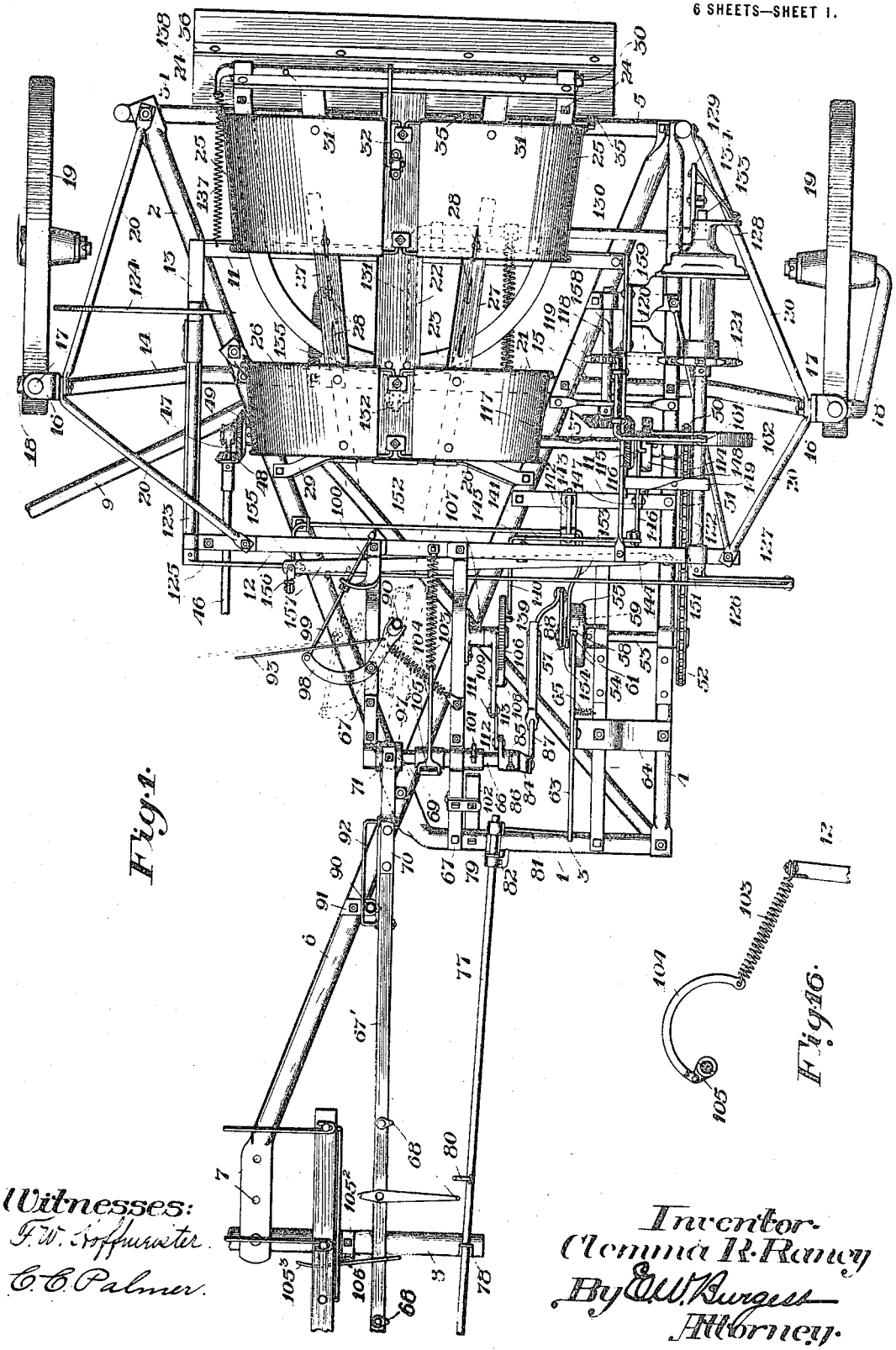

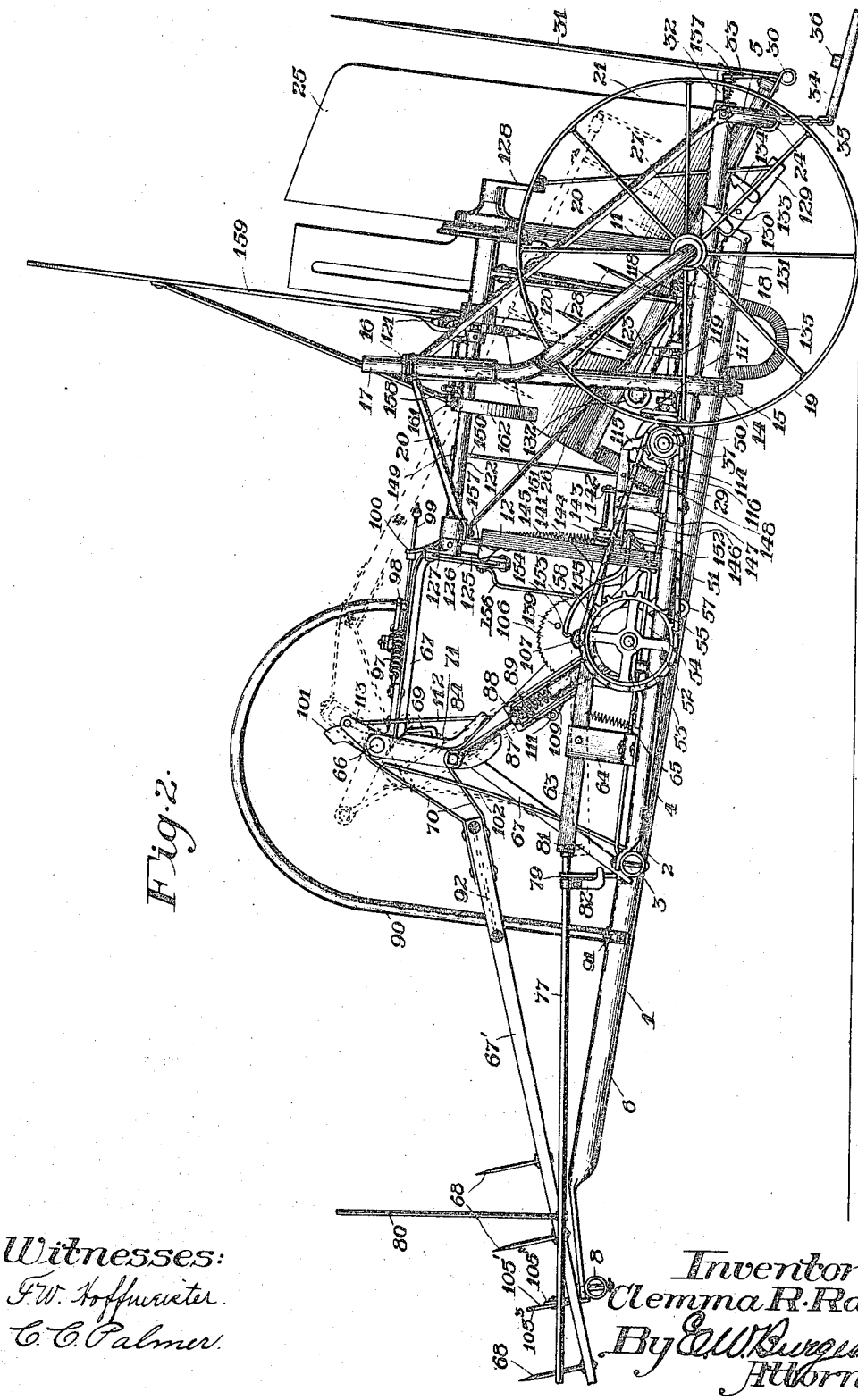

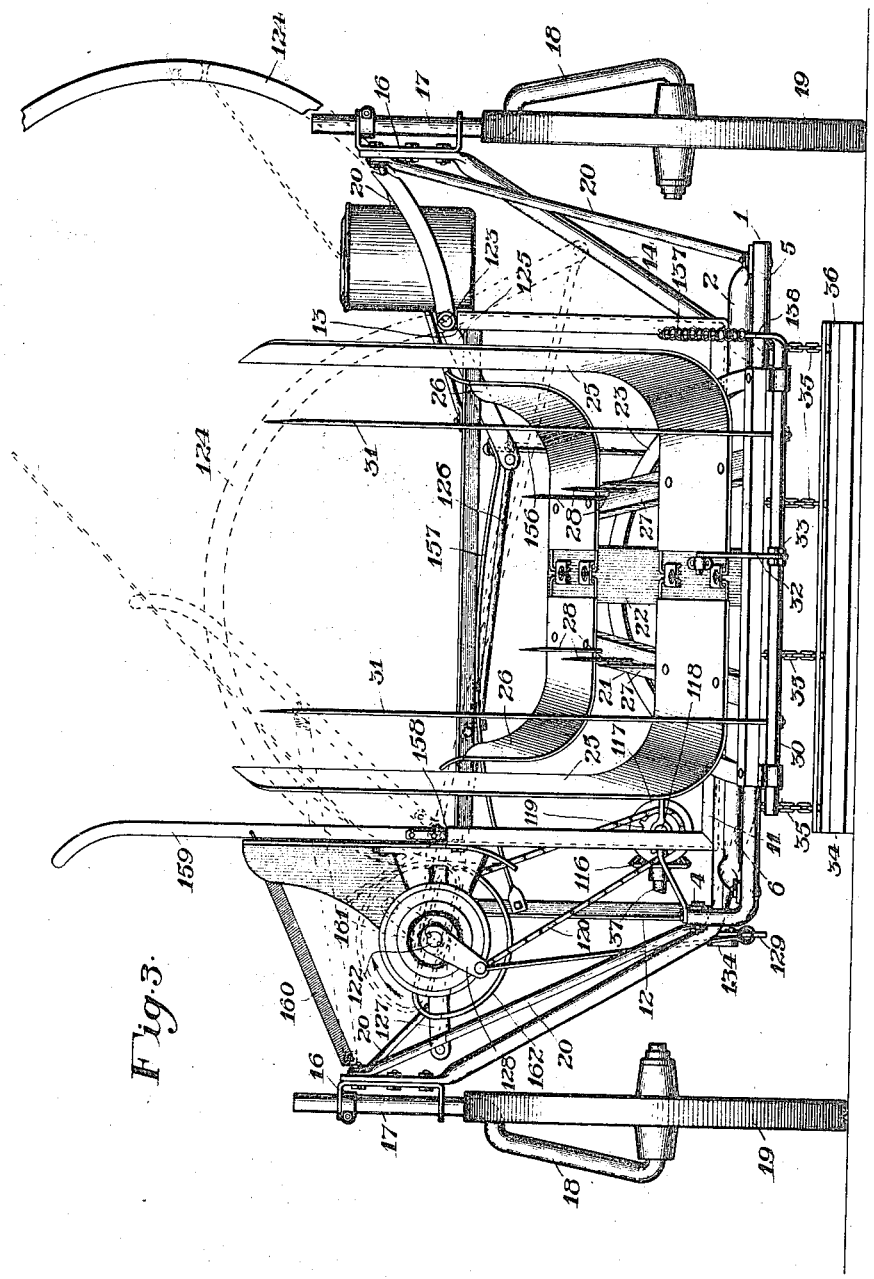

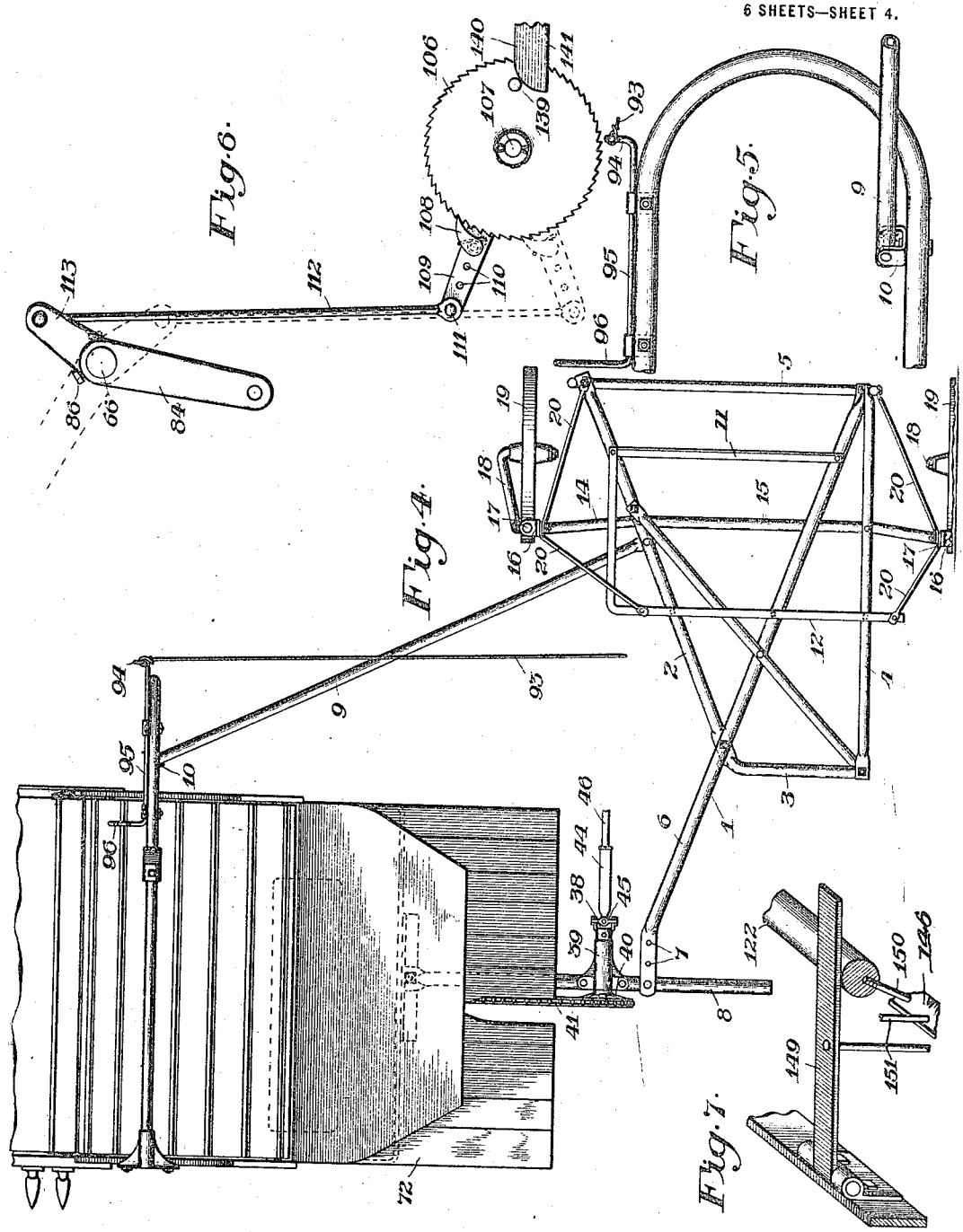

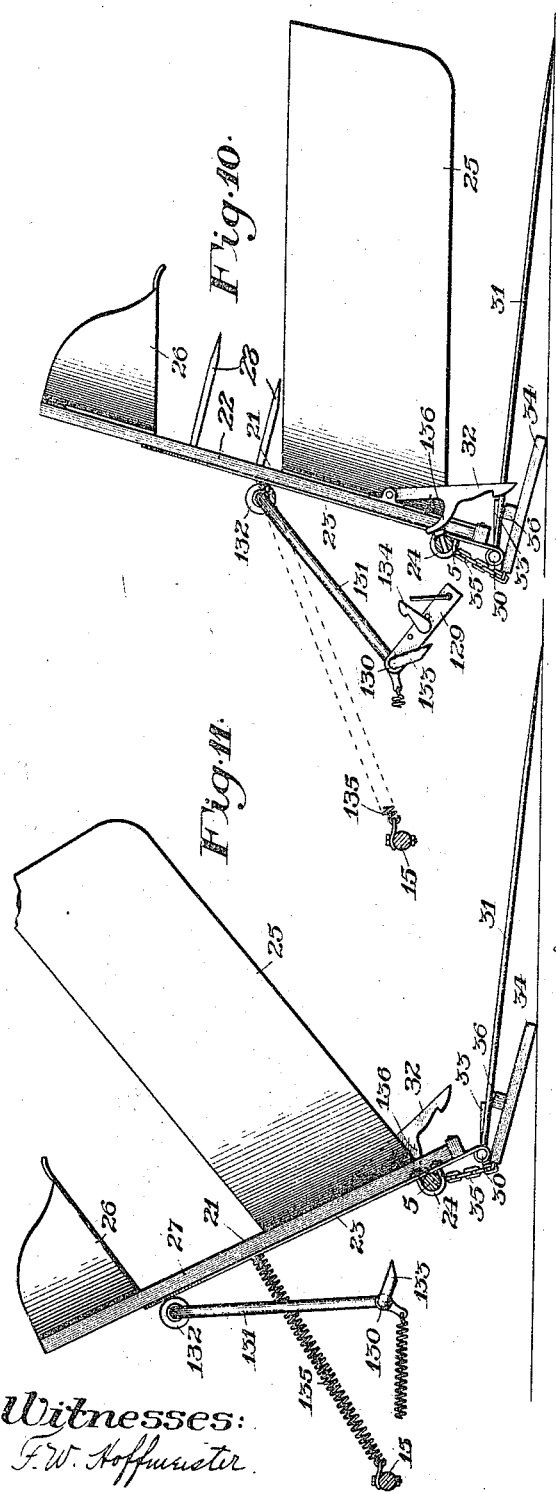

UNITED STATES PATENT OFFICE.

CLEMMA R. RANEY, OF CHICAGO, ILLINOIS, ASSIGNOR TO INTERNATIONAL HARVESTER COMPANY OF NEW JERSEY, A CORPORATION OF NEW JERSEY.

GRAIN-SHOCKER.

1,226,369.   Specification of Letters Patent.   Patented May 15, 1917.

Application filed January 29, 1912. Serial No. 674,135.

*To all whom it may concern:*

Be it known that I, CLEMMA R. RANEY, a citizen of the United States, residing at Chicago, in the county of Cook and State of Illinois, have invented certain new and useful Improvements in Grain-Shockers, of which the following is a specification.

My invention relates to grain shocking machines designed for use as an attachment for grain harvesters, and the principal object of the same is to provide a grain shocking machine receiving power to actuate it from the harvester and in which the various operations of delivering the sheaves from the harvester, collecting them into a shock and binding and depositing the shock upon the ground are automatically controlled. I attain these objects by means of mechanism, one embodiment of which is illustrated in the accompanying drawings, in which—

Figure 1 represents a top plan view of the grain shocker;

Fig. 2 is a side elevation of Fig. 1;

Fig. 3 is a rear end elevation of Fig. 1;

Fig. 4 is a top plan view of part of a grain harvester, the wheeled frame of the shocker attachment and illustrating the manner of attaching the latter to the frame of the harvester;

Fig. 5 is a detached detail representing part of the seat supporting member of the harvester frame and illustrating the manner of connecting the wheeled frame of the shocker therewith and the manner of mounting the sheaf delivering controlling mechanism thereon;

Fig. 6 is a side elevation of an index wheel and part of its actuating mechanism;

Fig. 7 is a detached detail representing part of the automatic means for controlling the movement of the shocking mechanism;

Fig. 8 is a top plan view of part of a harvester and its grain binding attachment and designed to illustrate the manner of delivering the sheaves of grain to the shocker attachment;

Fig. 9 is an end elevation of Fig. 8;

Fig. 10 is a detached detail of the sheaf receiving cradle showing the manner whereby it is oscillated to a shock dumping position;

Fig. 11 is a similar view showing the cradle as being returned to its initial position;

Fig. 12 represents a detail part of the cradle dumping mechanism;

Fig. 13 represents a detail of the sheaf delivery fork operating mechanism;

Fig. 14 represents a detail part of Fig. 13;

Fig. 15 represents a detail of the intermittently operating clutch mechanism forming part of the fork actuating mechanism; and Fig. 16 is a detached detail of the counterbalancing spring mechanism connected with the fork operating means.

The same reference numerals designate like parts throughout the several views.

1 represents the base portion of the wheeled frame substantially triangular in form, upon which is mounted the shocker mechanism, the base frame including side sill member 2 at the grainward side thereof, that inclines forward and stubbleward in the direction of the line of draft of the machine and having a front portion 3 arranged transversely relative to the line of draft, a longitudinally arranged side sill member 4, having its front end secured to the outer end of the transverse member 3 and its rear end to the outer end of a transverse rear sill member 5, the opposite end of sill 5 being secured to the rear end of frame member 2. 6 represents a draft member of the wheeled frame arranged diagonally across said frame, having the rear end thereof secured to the outer end of frame member 5, and the middle portion thereof to frame member 2 at the inner end of the transverse portion 3 thereof, the front end of the draft member being arranged in the direction of the line of draft of the machine and provided with a series of openings 7 spaced apart in a fore and aft direction whereby said draft member may be adjustably connected with a bar 8 that is secured to the wheeled frame of the grain harvester and extends stubbleward therefrom below and beyond the deck of the binder attachment thereof. 9 represents a supplemental draft member having its rear end secured to the middle portion of frame member 2 and extending forward and grainward has the front end thereof pivotally connected with a bracket member 10, preferably secured to the seat supporting pipe forming part of a grain harvester frame. 11 represents a wheeled frame member arranged in front of and parallel with the rear sill member 5 and having opposite ends thereof secured to draft member 6 and side sill member 2, and 12 represents a supplemental transverse sill member spaced apart from member 11 toward the front of the wheeled frame and secured to the draft and side sill members and having opposite ends thereof projecting beyond said side sill members, and the grainward end thereof connected with the grainward end of member 11 by means of member 13 arranged in a fore and aft direction. 14 represents a transversely arranged frame member having a horizontal portion 15 secured to the lower sides of the side sill members and extending laterally and upward therefrom upon opposite sides of the frame structure are provided with vertically arranged portions to which are secured U-shaped brackets 16, having openings in their leg portions that receive the vertical stem portions 17 of caster wheel supporting members 18, having laterally turned portions at their lower ends, upon which are journaled caster wheels 19, and 20 and 20 represent brace members connecting the upper ends of member 14 with the base of the frame structure upon opposite sides thereof. 21 represents a sheaf receiving and shock forming cradle including a central plate 22 and U-shaped base member 23 having the central plate secured thereto, the rear ends of the legs of the U-shaped member being pivotally connected with member 5 of the wheeled frame by means of U-bolts 24 in a manner to oscillate thereon. 25 represents vertically and oppositely arranged side wall members having their lower ends curved downward and inward and secured to the central plate 22 at its rear end, and 26 similar members having their lower inward curved ends secured to the central plate at its front end, and 27 represents bars arranged in a fore and aft direction at the bottom of the cradle upon opposite sides of the central plate, each bar being provided with a series of vertically arranged tines 28 that engage with the lower tier of sheaves as they are received by the cradle. 29 represents a transversely arranged arched bracket member having opposite ends thereof secured to the base of the wheeled frame and operative as a rest for the front end of the receiving cradle when the latter is in a sheaf receiving position and in a manner having the bottom thereof inclining downward from front to rear. 30 represents a rock shaft journaled upon the rear end of the side bars of the U-shaped member 23 and provided with tines 31 at opposite ends thereof that are normally retained in a substantially vertical position while the cradle is in a sheaf receiving position, the retaining means including a latch member 32, having one end thereof pivotally connected with the rear end of the central plate 22 of the cradle, the opposite end thereof being adapted to engage with the outer end of an arm 33 secured to the rock shaft. 34 represents an apron arranged transversely across the rear end of the bottom of the cradle and connected to the frame member 5 by means of short flexible members 35 in a manner permitting the lower rear side of the apron to trail upon the ground, and 36 represents a slat secured to the middle part of the apron and extending throughout the length thereof. 37 represents a primary power transmitting shaft journaled in bearings carried by the wheeled frame and arranged transversely across said frame near the middle portion thereof. 38 represents a shaft arranged in a fore and aft direction relative to the line of draft of the machine and journaled in a bracket 39 secured to the bar 8, and 40 represents a sprocket wheel secured to the front end of the shaft, the sprocket wheel being operatively connected, by means of a chain 41, with a sprocket wheel 42 secured to the crank shaft 43 of a harvester. The rear end of shaft 38 is connected with a sleeve 44 by means of a universal coupling 45. The hollow of the sleeve is angular in cross section and receives the front end of an angular shaft 46 in a slidable manner, the rear end of the shaft 46 being journaled in a yoke member 47 that is adapted to swing about the axis of the transverse shaft 37 and having secured to the rear end thereof a bevel pinion 48 that engages with bevel wheel 49 secured to the transverse shaft 37. Upon the opposite end of shaft 37 is secured a sprocket wheel 50 that, by means of a chain 51, transmits motion to a sprocket wheel 52 secured to the outer end of a countershaft 53 journaled parallel with the shaft 37 upon the base frame near the forward end thereof, and 54 represents a constantly rotating clutch member secured to the opposite end of said shaft and provided with a rim portion 55 having depressions 56 upon the inner surface thereof. 57 represents a clutch member having the form of an arm, loosely mounted upon the shaft adjacent the fixed clutch member and having pivotally mounted thereon a common form of pawl arm 58 that carries a roller 59 that is adapted to engage with the depressions in a well-known way to lock the two parts of the clutch mechanism in operative relation, the pawl arm being provided with the toe member 60 to engage with the hub forming part of the clutch member 57, and an outwardly extending head portion 61 whereby the pawl arm may be turned in a direction to disengage the clutch roller, and 62 represents a coiled spring operative between the hub of the clutch member 57 and the pawl in a manner to normally press the pawl in a direction to cause the roller to engage with the depressions. 63 represents a clutch controlling lever pivotally connected intermediate its ends upon a bracket member 64 that is secured to the base frame of the machine, and 65 represents a tension spring having one end connected with the clutch controlling lever and its opposite end with a fixed part of the base frame, the spring being operative in a manner to normally hold the lever in engagement with the head 61 of the pawl arm 58 and thereby prevent the roller 59 from engaging with the depressions in the constantly rotating clutch member. 66 represents a transverse rock shaft journaled in bearings carried by bracket members 67 that have the leg portions thereof secured to the base frame of the machine near the front end thereof and upon the side opposite that carrying countershaft 53. 67¹ represents a sheaf delivering fork having one end thereof connected with the rock shaft and the opposite end thereof provided with a series of fork tines 68. The fork arm is connected with the shaft by means of a bracket member 69 rigidly secured to the shaft, and strap members 70 having one end thereof secured to the fork arm and the opposite ends pivotally connected with opposite ends of the bracket member by means of bolts 71 whereby the fork arm is permitted to swing laterally relative to the line of draft of the machine for a purpose to be described later. 72 represents the deck of a grain binder, 73 the sheaf discharging arms and 74 the stripper coöperating with the discharge arms in delivering the bound sheaves from the binding mechanism. As ordinarily constructed, the stripper permits the bundle to be discharged from the deck as the discharge arms sweep outward in their operative movement. It is desirable in the operation of an automatic shocker that a bound sheaf be retained upon the binder attachment until a second sheaf is discharged, and to meet that requirement the stripper is made longer and a supplemental deck is connected with the lower end of the deck proper and extends outward therefrom in substantially a horizontal plane, as shown in Fig. 9. The supplemental deck includes a pair of U-shaped members 75 having their head portions secured to the deck of the grain binder upon opposite sides of the stripper and curving downward and outward they have the opposite ends thereof secured to a bar 76 arranged parallel with the lower edge of the deck of the grain binding attachment, the supplemental deck coöperating with the stripper in a manner to retain a bound sheaf until a second one has been discharged from the binding mechanism, as shown in Fig. 9.

When the sheaf delivering fork is in a receiving position, its front end rests upon the bar 8, adjacent and below the outer end of the supplemental deck, with the tines thereof disposed vertically in a manner to pierce the sheaf when the fork is caused to oscillate in an upward and rearward direction. 77 represents a clutch tripping rock shaft mounted upon the stubbleward side of the sheaf delivering fork, having its front end slidably journaled in a bracket 78 secured to the bar 8 and its rear end in a bracket 79 secured to the base frame of the shocker mechanism. It will be obvious that as the shocker tongue 6 is adjusted longitudinally of the grain harvester by means of the openings 7, the shaft 77 will be automatically adjusted by means of the sliding connection 78 of said shaft with the grain harvester. 80 represents vertically arranged arms secured to the front end of the rock shaft and arranged within the path of the sheaves as they are delivered from the binder deck over the sheaf delivering fork and operative to rock the shaft in its bearings when the sheaves are pressed against them. Secured to the rear end of the rock shaft is an arm 81 that projects stubbleward therefrom, the outer end of the arm being received by an opening in the front end of the clutch controlling lever 63 whereby the lever is released from its engagement with the clutch mechanism each time that the shaft is rocked by the discharge of a sheaf against the arms 80, and 82 represents a supplemental arm secured to the rock shaft and operative to engage with the bracket member 79 in a manner to limit a rocking movement of the shaft in a tripping direction. 84 represents a crank arm loosely mounted upon the end of shaft 66 in a manner permitting a limited independent angular movement thereof relative to the shaft, the hub of the arm being provided with a circumferential slot 85 that receives a stud 86 projecting outward from said shaft in a manner whereby the required result is attained. Crank arm 84 is connected with clutch arm 57 by means of a longitudinally yielding pitman 87 that includes a common form of yoke 88 and a compression spring 89 whereby a rocking movement in opposite directions is imparted to shaft 66 in a yielding manner, the shaft being first rocked rearward in a manner to cause the sheaf delivering fork to swing upward and rearward in a substantially vertical plane to deliver the sheaf to the shock-forming cradle. To assist the receiving cradle in properly collecting the sheaves of grain preparatory to the operation of the shock-binding mechanism, it is necessary that they be placed in the cradle in regular order and not promiscuously, and to produce that result is the function of the lateral swing of the sheaf delivering fork as it moves upward and rearward, the means devised for that purpose including a U-shaped fork controlling rod 90, having one leg thereof pivotally connected with a bracket member 91 secured to the draft member 6 of the wheeled frame in front of the shaft 66, the upper end of the rod being formed semi-circular and concentric with the axis of movement of the fork, and 92 represents a loop member secured to the side of the fork arm and operative as a guide therefor in controlling a lateral swing of the fork. The end of the rear side of the semi-circular portion of the fork controlling guide is connected, by means of a rod 93, with an arm 94 integral with a rock shaft 95 mounted in bearings carried by the seat supporting pipe of the harvester and having a lever arm 96 within convenient reach of the operator's foot whereby the fork controller may be thrown in a direction to cause the fork to swing laterally as it moves rearward in a manner to deposit a sheaf upon one side of the sheaf receiving cradle, with the butt thereof pierced by one of the tines 28 upon that side. A tension spring 97, has one end connected with the controlling rod by means of lever 98, pivotally connected with the frame, and having a fork at one end that receives the fork controller, and the opposite end thereof connected with one end of a link 99, the opposite end of the link being slidably received by a bracket member 100 secured to the frame structure and operative to limit a swinging movement of the fork controlling rod in either direction as it is swung laterally about its pivotal connection with the bracket member 69 by the operator manipulating the foot lever or by the reaction of the tension spring, the fork being swung from side to side in a manner to deposit the sheaves in two vertically arranged tiers upon opposite sides of the cradle until a predetermined number have been deposited therein. By means of the slot in the hub of crank arm 84 the fork is only actuated positively during a part of its oscillatory movement, and in delivering the sheaf the fork is free to fall by gravity during the latter part of its rearward movement, whereby, as the cradle is filled with sheaves, the angular movement thereof is gradually decreased. 101 represents a cam secured to the fork actuating shaft and adapted to engage with a plate spring 102 secured to the frame structure in a manner to yieldingly resist a rearward swing of the fork when falling by gravity when delivering a sheaf, and 103 represents a tension spring having one end connected with the frame structure and the opposite end thereof, by means of a link 104, with an arm 105 secured to the fork actuating shaft, whereby a forward swing of the fork to its sheaf receiving position is yieldingly resisted. 105[1] represents a gravity latch pivotally mounted intermediate its ends upon a bracket 105[2] that is secured to the bar 8 secured to the harvester, one portion of the latch upon the stubbleward side of its pivot being adapted to rest upon the fork when the latter is in a sheaf receiving position, and thereby prevent any upward rebounding of the same, and a tail portion upon the opposite side of its pivot that will swing to a position, when the fork is moved upward, that will bring it within the path of movement of the fork as it is being returned to a sheaf receiving position. The fork, in its return movement, contacts with the tail portion and causes the opposite end thereof to swing outward and downward over the fork, as illustrated by Fig. 9, the latch being provided with a guard member 105[3] that prevents any entanglement thereof with loose grain falling from the deck of the grain binder.

The number of sheaves to be delivered to the cradle to form a shock is controlled by means of an index wheel 106 journaled upon a stud 107 secured to the frame structure, said wheel being provided with ratchet teeth upon the periphery thereof that are engaged by a spring pressed pawl 108 pivotally mounted upon a lever 109 that is connected with said wheel in a manner to oscillate about the axis thereof. The oscillating pawl carrying lever is provided with a series of openings 110 spaced apart in a radial direction and which selectively receive a pivot pin 111 whereby the lever is connected with one end of a pitman 112, the opposite end of the pitman being pivotally connected with an arm 113 secured to the fork actuating rock shaft. The degree of angular movement of the lever 109 is determined by the connection of the pitman, so that the greater or less the connecting pin is moved inward or outward relative to the axis of the wheel the throw is correspondingly varied, and as the movement of the lever is controlled by the fork actuating means, the number of sheaves deposited in the cradle may be gaged by the number of oscillations of the lever that is required to impart one complete revolution to the index wheel. After a predetermined number of sheaves have been delivered to the sheaf receiving and shock forming cradle, they are bound into a shock, and the shock binding mechanism includes a constantly rotating clutch member 114 secured to the primary power transmitting shaft 37, the clutch member having a rim portion provided with radially arranged depressions like in form to those of clutch member 54, and 115 represents a pawl member that carries a like roller to that mounted upon pawl 58, pawl 115 being pivotally mounted upon a bevel gear wheel 116 loosely mounted upon the shaft 37 and adapted to rotate therewith when the pawl carried thereby engages with the clutch member secured to the shaft. The bevel gear wheel 116 is in mesh with a corresponding wheel 117 secured to one end of a shaft 118 journaled in a fore and aft direction upon the base of the wheeled frame and having a sprocket wheel 119 secured thereto that is operatively connected, by means of a chain 120, with a sprocket wheel 121 secured to a longitudinally arranged knotter actuating shaft 122 journaled in bearings carried by the wheeled frame upon one side of the sheaf receiving cradle, the wheel 119 having a diameter equal to one-half that of wheel 121. 123 represents a needle shaft journaled in bearings carried by the wheeled frame, upon the opposite side of the sheaf receiving cradle, and having secured to one end thereof a needle 124, the opposite end of the needle shaft being provided with a crank arm 125 that is connected, by means of a pitman 126, with a similar crank arm 127 secured to the front end of the knotter actuating shaft 122. Secured to the opposite end of the knotter actuating shaft is a crank arm 128 that is operatively connected with a lever 129 loosely mounted upon one end of a rock shaft 130 journaled transversely across the wheeled frame in bearings carried thereby, and below the sheaf receiving cradle when the latter is in a sheaf receiving position. The rock shaft is provided with a forwardly turned arm 131 at its inner end, the front end of said arm having a roller 132 journaled thereon that engages with the bottom of the sheaf receiving cradle in a manner to turn the latter to a vertical position for the purpose of dumping a shock, and 133 represents a crank arm integral with the rock shaft adjacent lever 129, and adapted to be engaged by a gravity pawl 134 pivotally mounted upon said lever, the operation of the associated parts being such that when the knotting mechanism has performed its function and the needle is being returned to its initial position, shaft 130 is rocked rearward to dump the shock, the gravity pawl being released as the cradle nears a vertical position, and as soon as the rock shaft 30 is released from its retaining latch member 32 the tension spring 135, having one end connected with the bottom of the cradle, and the opposite end thereof with the base of the wheeled frame, operates to quickly return the cradle to its initial sheaf receiving position. The latch member 32 is released from its engagement with arm 33 by means of a projecting cam shaped wing portion 136 thereon engaging with the rear transverse member of the wheeled frame, as shown in Figs. 10 and 11, and when the tines 31 are drawn forward away from the shock, a tension spring 137, having one end connected with a crank arm 138, formed upon the inner end of rock shaft 30, and the opposite end of said spring being connected with a fixed part of the wheeled frame, the operation thereof is to quickly return the tines 31 to substantially a vertical position when the cradle has returned to a sheaf receiving position.

For the purpose of tripping the shock binding mechanism into action when a predetermined number of sheaves have been delivered to the cradle, the index wheel 106 is provided with a laterally projecting pin 139 that engages with the front end of an arm 140 integral with one end of a lever 141 that is pivotally connected intermediate its ends with a bracket member 142 by means of a pin 143, the bracket member being secured to the base frame of the machine. The opposite end of lever 141 is provided with a weight 144, and 145 represents a tension spring having one end thereof connected with the lever upon the opposite side of its pivotal connection with the bracket, the opposite end of the spring being connected with a fixed part of the frame structure whereby the spring is operative to yieldingly resist a downward swing of the lever caused by the engagement therewith of the pin 139 of the index wheel and to quickly vibrate said lever in the opposite direction when said pin is released from engagement therewith, thereby causing the weighted end of the lever to strike one end of a clutch tripping lever 146, that is pivotally connected, intermediate its ends, with a bracket member 147 secured to the base frame of the main structure, the opposite end of said clutch tripping lever being in engagement with the pawl member 115 forming part of the intermittently operating power transmitting mechanism connected with the shock binding mechanism and operative to hold the clutch member disengaged in a well-known way until released by the weighted end of lever 141 striking the opposite end thereof and thereby rocking the lever about its pivotal connection, a tension spring 148 being connected with the lever and a fixed part of the frame structure and operative to vibrate the lever in an opposite direction.

It requires two revolutions of the gear wheels 116 and 117 upon the shafts 37 and 118, respectively, to operate the shock binding mechanism through one complete cycle, as the sprocket wheels 119 and 121 have a ratio of one to two, and to prevent the lever 146 from releasing the pawl member 115 of the clutch mechanism when the gear wheel 116 has made one revolution, there is provided means for retaining the lever 146 in a position outside of the path of the pawl until said gear wheel has made two revolutions, the means including a lever 149 having its inner end pivotally connected with a fixed part of the frame structure and its opposite end overlapping the knotter actuating shaft 122 and adapted to contact with a stud 150 carried by the shaft and operative to raise the lever when the knotter actuating shaft is caused to rotate, and 151 represents a link connection between said lever and the clutch stripping lever 146 whereby the latter is held outside of the path of the clutch pawl during each alternate revolution of the gear wheel 116.

It is necessary to provide means whereby the operation of the sheaf delivering fork is suspended during the operative movement of the shock binding and cradle dumping mechanism, said means including a transversely arranged clutch controlling rock shaft 152 mounted upon the base of the machine structure and provided at one end with a laterally projecting arm 153 having a hook portion 154 at its front end that is adapted to engage with the head portion 61 of the pawl arm 58 in a manner to hold the associated clutch parts disengaged when the shaft 152 is rocked in one direction, the opposite end of the shaft being provided with a laterally extending arm 155, the outer end of said arm being connected, by means of a link 156, with the free end of a plate spring member 157, the opposite end of said spring member being rigidly secured to a fixed part of the frame structure. The free end of the spring normally rests upon the outer end of the needle actuating crank arm 125 when the needle is in a retracted position and is raised thereby sufficient to cause the clutch controlling rock shaft 152 to rock to a position whereby the hook portion 154 on the arm 153 is beyond the path of the clutch pawl, and as soon as the needle is caused to begin its shock binding movement and its actuating crank arm 125 moves away from the spring, the latter, through its resiliency and its link connection with the clutch tripping rock shaft, causes the latter to turn in a direction whereby the hook 154 is caused to engage with the pawl arm 58 and hold the latter disengaged; even if the clutch controlling lever 63 should be disengaged from the pawl arm while the needle and shock dumping mechanism is performing its function.

For the purpose of relieving the needle from the heavy duty of compressing the shock apart from its function of carrying the twine from the knot tying mechanism, I provide an auxiliary shock compressing mechanism including a longitudinally arranged rock shaft 158 mounted upon the frame structure of the machine adjacent the knot tying mechanism, and having an integral arm portion 159 at the rear end thereof that is normally yieldingly held in a substantially vertical position by means of a tension spring 160, having one end thereof connected with said arm and the opposite end thereof with a fixed part of the frame structure, the opposite end of the shaft being provided with an integral laterally extending arm 161 that engages with a cam 162 secured to the knotter actuating shaft 122, the cam being operative to cause a rocking movement of shaft 158 in a direction to swing the arm 159 into contact with the shock in advance of the movement of the needle in an opposite direction toward the knot tying mechanism, and when the needle is retracted the spring 160 quickly returns the arm to its initial position.

The entire mechanism, excepting the manually controlled means for swinging the sheaf delivering fork laterally, is automatic in its action, and when the second sheaf is delivered from the grain binder it moves the initial sheaf over the fork against the arm carried by the clutch tripping rock shaft, and a rocking movement of the latter trips the clutch mechanism forming part of the actuating means associated with the sheaf delivering fork and operative to swing the latter in substantially a vertical plane upward and rearward and thereby deposits the sheaves in a reversed position in the cradle, the operator manipulating the foot lever in a manner to cause the fork to deposit the sheaves at either side of the cradle. When a predetermined number of sheaves have been deposited, the number being controlled by the index wheel, the latter trips the shock binding mechanism and the shock dumping means into operation and the shock is delivered from the cradle in a vertical position upon the ground, the trailing apron being operative to depress the stubble and to draw the butts of the sheaves forming the front part of the shock forward in a manner to prevent any tendency of the upper end of the shock to tilt forward under the momentum of its forward movement. As soon as the shock is set the cradle returns to its sheaf receiving position and the fork actuating mechanism resumes its operation.

It is also to be noted that in my improved construction the sheaves are so delivered in the receptacle that the heads of the same overlap or are interwoven in such a manner as to form a shock of exceedingly stable character and one well adapted to stand in the field and withstand the jar of setting the same upon the ground. As shown, the butts of the sheaves in the receptacle are also spaced by the sheaf delivery mechanism in such a manner as to give a relatively wide butt adapted to further increase the stability of the shock, and the sheaves in the shock are each held definitely in place by the tines 31 spaced apart at the rear end of the receptacle upon which the sheaves are impaled as they are delivered to the receptacle by the sheaf delivery member. Through the holding action of these tines it will be noted, therefore, that it is impossible for the sheaves to shift laterally in the receptacle and thus cause any irregularity in the shock or the production of any shock base other than one having a relatively wide base. When the shock is set these tines are of course released by the action of the member 32 which in turn is controlled by the shock receptacle. Attention is also directed to the fact that in my improved construction the sheaf delivery member is likewise maintained in a definite relation to its movable guide and that there is no rebounding movement of the sheaf delivery member when the latter is deflected, the sheaf delivery member instead being always attached to and moving along the guiding member which is itself deflected. In connection with the sheaf delivery mechanism, attention is also directed to the fact that through the provision of my improved member 80 it is impossible for a sheaf ejected from the binder deck to be thrown beyond the fork, and that by the provision of this improved means and its connections to the fork clutch, the fork is definitely tripped into operation as each sheaf is delivered from the binder deck, the possibility of failure of operation being thereby avoided. It should also be noted that due to my improved power connections for the binder and the connection of the shocker to the laterally extending member projecting beneath the binder deck, driving mechanism is provided which is operative in all positions of the binder and shocker and by which any effects of the vertical adjustment of the binder are minimized.

While I have in this application specifically described one embodiment which my invention may assume in practice, it is to be understood that the form illustrated herein is used for purposes of illustration and that my invention may be modified and embodied in other forms without departing from its spirit.

What I claim as my invention, and desire to secure by Letters Patent, is:

1. In a shocking machine, a prostrate shock receptacle, and means for building therein a prostrate shock in which the butts of the sheaves diverge and the heads overlap.

2. In a shocking machine, a prostrate shock receptacle, sheaf delivery means delivering sheaves thereto, and means operating upon said delivery means whereby the sheaves are so deposited as to weave their heads together.

3. In a shocking machine, a shock receptacle, sheaf delivery means delivering sheaves thereto, and means operating upon said delivery means whereby the sheaves are built up in the shock receptacle with their heads interwoven and their butts spaced apart.

4. In a shocking machine, a frame, a sheaf receiving member reclining thereon and pivoted thereto at its extreme rear end, shock building mechanism for building up a prostrate shock therein in which the tops of the sheaves converge and the butts diverge, and automatic means set in operation by said mechanism for turning said receiving member substantially upright and setting the shock therein butt downward upon the ground.

5. In a shocking machine, a frame, a sheaf receiving member normally reclining thereon and pivoted thereto at its extreme rear end, shock delivering mechanism placing sheaves therein in successive substantially parallel layers and in such a manner that the sheaf tops converge, and automatic means set in operation by said mechanism for binding said sheaves into a shock and elevating said receiving member about its pivot.

6. In a shocking machine, a frame, a shock receptacle thereon, shock building mechanism including a swinging sheaf delivery member movable through arcs of decreasing amplitude for depositing sheaves prostrate in said receptacle with their tops converging and their butts diverging, and means for binding said sheaves into a shock set in operation by said mechanism when the shock has reached the size desired.

7. In a shocking machine, a frame, a shock receptacle thereon, shock building mechanism including a swinging sheaf delivery member movable through arcs of decreasing amplitude for depositing sheaves prostrate in said receptacle with their tops converging and their butts diverging, and means for discharging said sheaves in the form of a shock set in operation by said mechanism when the shock has reached the size desired.

8. In a shocking machine, a frame, a shock receptacle thereon, shock building mechanism including a swinging sheaf delivery member movable through arcs of decreasing amplitude for depositing sheaves prostrate in said receptacle with their tops converging and their butts diverging, and means for binding and discharging said sheaves in the form of a shock set in operation by said mechanism when the shock has reached the size desired.

9. In a shocking machine, a frame, a sheaf receiving cradle carried thereon, a sheaf delivery member pivoted to said frame and delivering sheaves to said cradle, means for driving said member through arcs of different amplitude to position sheaves in said cradle, and means for deflecting said sheaf delivery member laterally as it delivers a sheaf.

10. In a shocking machine, a frame, a sheaf receiving cradle carried thereon, a sheaf delivery member pivoted to said frame and delivering sheaves to said cradle, means for driving said member through arcs of different amplitude to position sheaves in said cradle, and means for alternately deflecting said sheaf delivery member laterally in opposite directions as it delivers a sheaf.

11. In a shocking machine, a frame, a prostrate shock receptacle thereon, and means including a swinging sheaf delivery member pivoted to said frame, said delivery member having continuous engagement with the sheaf until the same is placed in said receptacle for building under impact in said receptacle a prostrate shock in which the sheaves are arranged in layers and have their butts diverging and their heads converging.

12. In a shocking machine, a frame, a sheaf receiving cradle carried thereon, a sheaf delivery member pivoted upon said frame and delivering sheaves to said cradle, means for operating said member to build up a shock in said cradle with quick hammerlike blows, said delivery member having continuous engagement with the sheaf until the same is placed in said receptacle, and means for deflecting said member laterally as it descends to sheaf delivering position.

13. In a shocking machine, a frame, a sheaf receiving cradle carried thereon, a sheaf delivery member pivoted upon said frame and delivering sheaves to said cradle, means for operating said member to build up a shock in said cradle with quick hammerlike blows, said delivery member having continuous engagement with the sheaf until the same is placed in said receptacle, and means for deflecting said member laterally in a plurality of directions as it descends to sheaf delivering position.

14. In a shocking machine, a frame, sheaf delivery mechanism including a movable sheaf delivery member engageable with said frame, and means for preventing rebounding of said member upon engagement therewith.

15. In a shocking machine, a frame, sheaf delivery mechanism including a movable sheaf delivery member engageable with said frame, and means controlled by said delivery member for preventing rebounding thereof upon engagement with said frame.

16. In a shocking machine, a frame, sheaf delivery mechanism including a movable sheaf delivery member engageable with said frame, and means automatically engageable with said member upon engagement with said frame for preventing rebounding thereof.

17. In a shocking machine, a frame, sheaf delivery mechanism including a movable sheaf delivery member engageable with said frame, and latch mechanism engageable with said member when it engages said frame for preventing the rebounding of said member.

18. In a shocking machine, a frame, a sheaf delivery member pivoted thereon and movable upward and backward about its pivot, a guide for deflecting said delivery member laterally, and a sliding connection between said delivery member and guide.

19. In a shocking machine, a frame, a sheaf delivery member pivoted thereon and movable upward and backward about its pivot, a guide for said delivery member, a sliding connection between said delivery member and guide, and means for deflecting said guide laterally.

20. In a shocking machine, a frame, a horizontal pivot on said frame, a movable sheaf delivery member pivoted thereon, a guide for said delivery member, and means whereby the entire path of movement of said delivery member is positively determined by said guide.

21. In a shocking machine, a frame, a movable sheaf delivery member pivoted thereon, a guide for said delivery member, means whereby the entire path of movement of said delivery member is positively determined by said guide, and means operating upon said guide whereby said delivery member may be deflected laterally as it delivers a sheaf.

22. In a shocking machine, a frame, a sheaf delivery member pivoted thereon, means for moving the same about its pivot, a bowed upstanding laterally movable guide pivoted to the frame, and an operative connection between said guide and said delivery member.

23. In a shocking machine, a frame, a swinging sheaf delivery member pivoted thereon, a swinging guide therefor pivoted on said frame, an operative connection between said guide and delivery member, and a crank pivoted on said frame and connected to said guide.

24. In a shocking machine, a frame, a swinging sheaf delivery member pivoted thereon, a bowed guide pivoted on said frame and having a short arm, a sliding connection between said guide and said delivery member, a crank pivoted on said frame and connected to the short arm of said guide, and means for turning said crank on its pivot.

25. In a shocking machine, a frame, a swinging sheaf delivery member pivoted thereon, a bowed guide pivoted on said frame and having a short arm, a sliding connection between said guide and said delivery member, a spring-pressed crank journaled on said frame and connected to the short arm of said guide, and means for turning said crank on its pivot.

26. In a shocking machine, a frame, a sheaf receiving cradle thereon, a sheaf delivery member pivoted on said frame and delivering sheaves to said cradle, yielding means for swinging said member through arcs of decreasing amplitude to impart quick hammerlike blows to the sheaves as the same are built up in the cradle, and means for deflecting said member laterally as it descends to sheaf delivering position.

27. In a shocking machine, a frame, a sheaf receiving cradle thereon, a movable sheaf delivery member carried on said frame and delivering sheaves to said cradle, yielding operating means for said member successively driving the latter down into the cradle through paths of decreasing length to compress the sheaves already therein by quick hammerlike blows, and means for deflecting said member laterally as it descends to sheaf delivering position.

28. In a shocking machine, a frame, a sheaf receiving cradle thereon, a swinging sheaf delivery member pivoted upon said frame and delivering sheaves to said cradle, yielding operating means for said sheaf delivery member driving the latter down into the cradle through arcs of different amplitude to deposit sheaves in said cradle with quick hammerlike blows, and means for deflecting said member alternately in opposite directions laterally as it descends to sheaf delivering position.

29. In a shocking machine, a frame, a sheaf delivery member pivoted thereon, a sheaf receiving cradle receiving sheaves therefrom, a transversely movable swinging member pivoted to said frame, connections between said swinging member and said delivery member, and means for oscillating said swinging member about its pivot.

30. In a shocking machine, a frame, a sheaf receiving cradle carried thereon, a sheaf delivery member pivoted to said frame and movable in a vertical plane, a transversely movable swinging member carried by said frame, means for actuating said members, and operative connections between the sheaf delivery member and said swinging member imparting the movement of the latter to said delivery member.

31. In a shocking machine, a frame, a normally prostrate dumping shock receptacle thereon, means for delivering sheaves prostrate therein and spacing the butts of the delivered sheaves, and upstanding tines in said receptacle for holding the butts of the delivered sheaves against lateral movement from their delivered positions.

32. In a shocking machine, a frame, a normally prostrate dumping shock receptacle thereon, a swinging member pivoted to said frame at one end of said receptacle and movable to deliver sheaves prostrate therein, means for deflecting said delivery member laterally as it delivers a sheaf, and upstanding tines in said receptacle impaling the sheaves as they are delivered.

33. In a shocking machine, a frame, a normally prostrate dumping shock receptacle thereon, a swinging member pivoted to said frame at one end of said receptacle and movable to deliver sheaves prostrate therein, means for deflecting said delivery member laterally as it delivers a sheaf, and upstanding end tines on opposite sides of said receptacle holding the butts of the delivered sheaves against lateral shifting.

34. In a shocking machine, a frame, a dumping shock receptacle thereon, a sheaf delivery member pivoted to said frame at one end of said receptacle and delivering sheaves therein, means for deflecting said delivery member laterally as it delivers a sheaf, and upstanding movable tines controlled by said shock receptacle impaling the sheaves as they are delivered.

35. In a harvesting machine, sheaf binding mechanism including sheaf binding and compressing arms, a binder deck adjacent thereto, a supplemental deck forming an extension of said binder deck, and mechanism for discharging a sheaf upon said supplemental deck and thereby ejecting from said supplemental deck a sheaf previously discharged by said mechanism.

36. In a harvesting machine, sheaf binding mechanism including sheaf binding and compressing arms, a binder deck, a supplemental deck forming an extension of said binder deck, and mechanism for discharging a sheaf upon said supplemental deck and thus pushing from said supplemental deck a previously discharged sheaf.

37. In a harvesting machine, sheaf binding mechanism including sheaf binding and compressing arms, a binder deck, a supplemental deck forming an extension thereof, and mechanism adjacent said binder deck for discharging a sheaf thereon onto said supplemental deck and thereby ejecting from said supplemental deck a sheaf previously discharged by said mechanism.

38. In a harvesting machine, a binder deck, a supplemental deck forming an extension of said binder deck, a member overhanging said supplemental deck and engageable with a sheaf to retain the sheaf thereon, and mechanism for discharging a sheaf upon said supplemental deck and thus pushing out between said supplemental deck and said member a previously discharged sheaf.

39. In a harvesting machine, sheaf binding mechanism, including sheaf binding and compressing arms, a binder deck, sheaf discharging mechanism adjacent thereto, and a supplemental deck forming an extension of said binder deck, said sheaf discharging mechanism discharging a sheaf upon said supplemental deck and said sheaf thus discharged ejecting from said supplemental deck the sheaf discharged by said sheaf discharging mechanism upon its last operation.

40. In combination, a binder deck, sheaf binding and compressing arms, sheaf discharging mechanism operable to discharge a sheaf thereon, means carried by said binder deck retarding the ejection of a sheaf therefrom until said sheaf discharging mechanism has discharged a second sheaf, and sheaf shocking mechanism automatically controlled by the sheaves ejected from said binder deck and operating in timed relation with said discharging mechanism.

41. In combination, a binder frame, a binder deck thereon, binding and discharging mechanism above said deck, sheaf delivery mechanism coöperating therewith including an upwardly and backwardly swinging sheaf delivery member normally disposed beneath said binder deck, and an upstanding sheaf stopping member disposed in the path of a sheaf discharged from said binding and discharging mechanism and located on the opposite side of said delivery member from said deck.

42. In combination, a binder frame, a binder deck thereon, sheaf binding and discharging mechanism above said deck, sheaf delivery mechanism coöperating therewith including a sheaf delivery member normally occupying a position beneath the edge of said deck, and a controlling member for said delivery mechanism extending upward into the path of a sheaf discharged from said deck and located on the opposite side of said delivery member from said deck.

43. In combination, a binder, a seat support thereon protruding rearward therefrom, a shocker trailing at the rear of said binder, a tongue protruding forward from said shocker, and a draft connection extending laterally from said shocker, said tongue being supported on the stubbleward side of said binder and longitudinally adjustable with respect thereto, and said draft connection being connected to the seat support on said binder at a point in the rear of the latter in such a manner as to permit independent movement of the shocker and binder.

44. In combination, a binder, a seat supporting member protruding rearwardly therefrom substantially parallel to the line of draft, a second member protruding therefrom and disposed substantially at right angles to the line of draft, a shocker frame having a forwardly protruding tongue supported by said last mentioned member and adjustable with respect thereto, and a draft connection between said seat supporting member and a point intermediate the ends of said shocker frame pivoted to said supporting member.

45. In combination, a binder, a main wheel therefor, power transmitting mechanism operatively connected thereto and disposed substantially at right angles to the plane of rotation thereof, a shocker frame trailed at the rear of said binder, a transversely extending main power shaft journaled on said shocker frame and disposed substantially at right angles to the line of draft, and a flexible connection intermediate said power shaft and said power transmitting mechanism on said binder and disposed in the line of draft transmitting the rotation of said power transmitting mechanism to the power shaft of said shocker.

46. In combination, a binder, a main wheel therefor, a rigid member attached to said binder protruding substantially at right angles to the line of draft, a power connection operatively connected to said main wheel and disposed in a plane parallel to said rigid member, a shocker adjustably attached to said rigid member at a point adjacent said power connection and trailing in the rear of said binder, a main power shaft carried on said shocker frame, and a flexible connection between said shaft and said power connection disposed substantially at right angles to one of the same and parallel to the line of draft.

47. In combination, a binder, a main wheel therefor, a rigid member protruding substantially at right angles to the line of draft of said binder, a power connection operatively connected to said main wheel and disposed in a plane parallel to said rigid member, a shocker frame adjustably attached to said rigid member at a point adjacent said power connection and trailing in the rear of said binder, a main power shaft carried on said shocker frame, and a flexible extensible power shaft operatively connected between said first mentioned power connection and the power shaft on said shocker frame and disposed at right angles to the latter.

48. In a shocking machine, a frame, mechanism for setting in upright position upon the ground a shock lying prostrate on said frame, and means trailing upon the ground at the rear of said frame and underlying the ends of certain sheaf butts in the shock for spreading the butt of the shock as it is set.

49. In a shocking machine, a frame, a shock receptacle thereon, mechanism operating upon said receptacle to set in upright position upon the ground a shock therein, and means normally trailing upon the ground at the rear of said frame for spreading the butt of a shock as it is set.

50. In a shocking machine, a frame, mechanism for setting in upright position upon the ground a shock built on said frame, and means carried by said frame and at the rear thereof for depressing the stubble beneath a shock as it is set and thereby eliminating tilting of said shock.

51. In a shocking machine, a frame, a shock receptacle carried thereon, means for moving the latter to shock discharging position, and a transversely extending member flexibly connected to said frame and trailing upon the ground at the rear thereof engageable with the butt of a discharged shock as the latter strikes the ground.

52. In a shocking machine, a frame, a sheaf receiving cradle carried thereon, means for moving the latter to shock discharging position, a transversely extending member flexibly connected to said frame and normally trailing upon the ground in the rear thereof, and a member extending transversely of said member engaging the butts of said sheaves as they are discharged from the cradle and pulling the same outward in the direction of movement of the frame.

53. A grain shocking attachment for harvesters including, in combination, a wheeled frame, a sheaf receiving and shock forming cradle mounted thereon, and means whereby said wheeled frame may be attached to a harvester in a manner to trail in rear thereof, means for delivering sheaves of grain from the harvester binding attachment to said cradle, said means including a fork movable in a vertical plane and in a fore and aft direction, a supplemental deck attached to the delivery end of the deck of the harvester binding attachment, and means for retaining a sheaf upon said supplemental deck whereby a second sheaf as it is discharged from the binding attachment will move the sheaf from said supplemental deck to a position within the path of movement of said fork.

54. In combination, a binder, sheaf discharging mechanism thereon, a shocker frame operatively connected to said binder and adjustable longitudinally thereof, a movable sheaf delivery member on said frame, and means controlling the operation of said delivery member and actuated upon the discharge of a sheaf by said discharging mechanism automatically adjustable as said shocker frame is adjusted relative to said binder.

55. A grain binding attachment for harvesters including, in combination, a wheeled frame, a shock former carried by said frame, means whereby said frame may be connected with a harvester in a manner to trail in rear thereof, means for delivering sheaves of grain from the harvester to said shock former, said means including a fork pivotally mounted upon said frame and adapted to swing in a fore and aft direction relative to the advance of the machine, manually controlled means for swinging said fork laterally, and means engaging with said fork through the entire range of movement thereof in opposite directions operative to control a lateral swinging movement of said fork.

56. A grain shocking attachment for harvesters including, in combination, a wheeled frame and means whereby said frame may be attached to a harvester in a manner to trail in rear thereof, a shock former mounted upon said wheeled frame, means for delivering sheaves of grain from the harvester to said shock former, said means including a fork pivotally mounted upon said frame and adapted to swing upward and rearward from the harvester to said shock former and from side to side, and a swinging guide mounted upon said frame and engaging with said fork during the entire range of movement thereof in opposite directions and operative in a manner to control a lateral swinging movement of said fork.

57. A grain shocking attachment for harvesters including, in combination, a wheeled frame, means whereby said frame may be attached to a harvester in a manner to trail in rear thereof, a shock former mounted upon said wheeled frame, means for delivering sheaves of grain from the harvester to said shock former, said means including a fork pivotally mounted upon said frame and adapted to swing upward and rearward from the harvester to said shock former and from side to side, a swinging guide mounted upon said frame and engaging with said fork during the entire range of movement thereof in opposite directions and operative in a manner to control a lateral swinging movement of said fork, a foot lever pivotally mounted upon the harvester adjacent the operator's seat, and a link connection between said foot lever and said swinging guide.

58. A grain shocking attachment for harvesters including, in combination, a wheeled frame, means whereby said frame may be attached to a harvester in a manner to trail in rear thereof, a shock former mounted upon said wheeled frame, means for delivering sheaves of grain from the harvester to said shock former, said means including a fork pivotally mounted upon said frame and adapted to swing upward and rearward from the harvester to said shock former and from side to side, a swinging guide mounted upon said frame and engaging with said fork during the entire range of movement thereof in opposite directions and operative in a manner to control a lateral swinging movement of said fork, a foot lever pivotally mounted upon the harvester adjacent the operator's seat, and a link connection between said foot lever and said swinging guide whereby the latter may be turned in one direction, and a spring mechanism operative to turn said swinging guide in an opposite direction.

59. A grain shocking attachment for harvesters including, in combination, a wheeled frame, a shock former carried by said wheeled frame, means whereby said wheeled frame may be connected with a harvester in a manner to trail in rear thereof, means for delivering sheaves of grain from the harvester to said shock former, said means including a fork pivotally mounted upon said frame and adapted to swing in a fore and aft direction about a horizontal axis relative to the advance of the machine, and means for swinging said fork laterally about an axis at right angles with the horizontal axis thereof during the operative movement thereof, means for controlling a lateral swinging movement of said fork, said means including a U-shaped guide member arranged concentric with the horizontal axis of said fork, having one leg thereof pivotally connected with said wheeled frame, a loop member secured to said fork and receiving said guide, and means for controlling a swinging movement of said guide about its pivotal connection with said frame.

60. A grain shocking attachment for harvesters including, in combination, a wheeled frame, a shock former carried by said wheeled frame, means whereby said wheeled frame may be connected with a harvester in a manner to trail in rear thereof, means for delivering sheaves of grain from the harvester to said shock former, said means including a fork pivotally mounted upon said frame and adapted to swing in a fore and aft direction about a horizontal axis relative to the advance of the machine, and means for swinging said fork laterally about an axis at right angles with the horizontal axis thereof during the operative movement thereof, means for controlling a lateral swinging movement of said fork, said means including a U-shaped guide member arranged concentric with the horizontal axis of said fork, having one leg pivotally connected with said wheeled frame, a loop member secured to said fork and receiving said guide, a foot lever pivotally mounted upon the harvester and connected with the opposite leg of said U-shaped guide in a manner whereby the operator may swing said guide in one direction, and a spring mechanism operative to swing said guide in an opposite direction.

61. A grain shocking attachment for harvesters including, in combination, a wheeled frame, means whereby said wheeled frame may be attached to a harvester, a tilting sheaf receiving cradle mounted upon said frame, means for delivering sheaves of grain from the harvester to said cradle and coöperating therewith in a manner to form a shock, means for tilting said cradle in a manner to discharge a shock upon the ground, and an apron flexibly connected with said wheeled frame in a manner to trail in rear of said cradle while a shock is being formed and adapted to engage with the lower forward portion of the shock as it is being discharged from said cradle.

62. A grain shocking attachment for harvesters including, in combination, a wheeled frame and means whereby said wheeled frame may be attached to a harvester in a manner to trail in rear thereof, a sheaf receiving and shock forming cradle pivotally mounted upon said wheeled frame and adapted to tilt in a fore and aft direction relative to the line of draft of the machine and in a vertical plane, means for delivering sheaves of grain from the harvester to said cradle and coöperating therewith in a manner to form a shock, means for tilting said cradle in a manner to discharge a shock upon the ground, and a trailing apron having one side thereof connected with the rear end of said wheeled frame by means of a series of short flexible members, and the opposite side thereof trailing upon the surface of the ground, said apron being adapted to engage with the lower forward portion of a shock as it is being discharged from said cradle.

63. A grain shocking attachment for harvesters including, in combination, a wheeled frame, a sheaf receiving and shock forming cradle pivotally mounted thereon, means whereby said wheeled frame may be attached to a harvester in a manner to trail in rear thereof, means for delivering sheaves of grain as they are discharged from the harvester binding attachment to said shock forming cradle, said means including a supplemental deck attached to the discharge end of the deck of the harvester binding attachment, means whereby a sheaf is retained upon said supplemental deck until a second sheaf is discharged from the binding attachment, an intermittently operating clutch mechanism forming part of said sheaf delivering means, and a combined clutch tripping and sheaf retaining member arranged within the path of the sheaf as it is discharged from the supplemental deck.

64. A grain shocking attachment for harvesters including, in combination, a wheeled frame substantially triangular in form and including a side sill member upon the grainward side thereof that inclines forward and stubbleward in the direction of the line of draft of the machine, a longitudinally arranged side sill member upon the stubbleward side thereof having the front end thereof secured to said inclined member and having the rear end thereof connected with the rear end of said inclined member by means of a transversely arranged gear sill member, an inverted U-shaped transversely arranged axle member having the lower horizontal portion secured to said side sill members and provided with vertically arranged portions at opposite sides of said wheeled frame, brackets adjustably secured to said vertically arranged portions, said brackets being provided with openings, caster wheel supporting members having vertically arranged stems received by said openings and provided with horizontally arranged journal portions having carrying wheels journaled thereon, and draft members secured to said wheeled frame and provided with means whereby they may be connected with the harvester.

65. A grain shocking attachment for harvesters including, in combination, a wheeled frame including an axle member having caster wheels connected with opposite ends thereof in a manner whereby said wheeled frame may be raised or lowered relative to said caster wheels, and means whereby said wheeled frame may be connected with the frame of a harvester in a manner to trail in rear thereof, grain shocking mechanism carried by said wheeled frame, means for actuating said grain shocking mechanism, said means including a longitudinally arranged shaft carried by the harvester and operatively connected with the power transmitting mechanism thereof, a primary power transmitting transversely arranged shaft mounted in bearings secured to said wheeled frame, a bevel gear wheel secured to the grainward end of said shaft, an arm mounted upon said shaft adjacent said wheel and adapted to turn about the axis thereof, a shaft having its rear end journaled in said arm and having a pinion secured thereto, said pinion meshing with said bevel gear wheel, the opposite end of said shaft being connected with said longitudinally arranged shaft by means of a universal coupling mechanism.

66. A grain shocking attachment for harvesters including, in combination, a wheeled frame including an axle member having caster wheels connected with opposite ends thereof in a manner whereby said wheeled frame may be raised or lowered relative to said caster wheels, and means whereby said wheeled frame may be connected with a harvester in a manner to trail in rear thereof, grain shocking mechanism carried by said wheeled frame, said mechanism including a sheaf receiver and shock former, a sheaf delivering mechanism and a shock binding mechanism, means for actuating said grain shocking mechanism, said means including a primary power transmitting transversely arranged shaft mounted in bearings secured to said wheeled frame near its middle portion, a secondary power transmitting shaft mounted in bearings secured to said wheeled frame and arranged parallel with said primary shaft, said primary shaft being operatively connected with said secondary shaft, said sheaf delivering mechanism being actuated by said secondary shaft by means including intermittently operating clutch mechanism mounted upon said shaft, said shock binding mechanism being operatively connected with said primary shaft by means including an intermittently operating clutch mechanism mounted upon said shaft and power transmitting means connecting said primary shaft with an operative part of the harvester.

67. A grain shocking attachment for harvesters including, in combination, a wheeled frame, a sheaf receiving and shock forming cradle mounted thereon, means whereby said wheeled frame may be attached to a harvester in a manner to trail in rear thereof, means for delivering sheaves of grain from the harvester binding attachment to said cradle, said means including a fork pivotally mounted upon said frame and adapted to swing in substantially a vertical plane and in a fore and aft direction relative to the line of draft of the machine and from the delivery end of the deck of the harvester binding attachment to said cradle, means for positively actuating said fork during a part only of its angular movement, a stop disposed adjacent the deck of the harvester binding attachment and adapted to limit a forward swing of said fork, and a latch member connected with said stop and adapted to engage with said fork in a manner to prevent a rebounding movement of the same in an opposite direction.

68. In a shocking machine, a shock receptacle, and a sheaf delivery member receiving and continuously engaging the sheaves until they are deposited in said receptacle for building up therein under impact a shock in which the heads of the sheaves overlap.

C. R. RANEY.

Witnesses:
C. G. GRZEGORZEWSKI,
E. L. BACON.